United States Patent Office

3,639,520
Patented Feb. 1, 1972

3,639,520
PRODUCTION OF BUTADIENE-STYRENE GRAFT COPOLYMERS WITH A NICKEL CARBOXYLIC ACID SALT OR NICKEL ORGANIC COMPLEX COMPOUND-TITANIUM TETRACHLORIDE-TRI-ALKYLALUMINUM CATALYST
Akira Onishi, Shiro Anzai, and Motoki Ishii, Tokyo, Japan, assignors to Bridgestone Tire Company Limited, Tokyo, Japan
No Drawing. Continuation-in-part of application Ser. No. 474,483, July 23, 1965. This application July 2, 1968, Ser. No. 741,908
Int. Cl. C08d 1/30; C08f 11/08
U.S. Cl. 260—880                       6 Claims

ABSTRACT OF THE DISCLOSURE

A process for manufacturing rubbery or plastic butadiene graft copolymers having a cis-1,4 content of at least 85% and substantially no gel, which comprises polymerizing butadiene, and copolymerizing styrene at a temperature of from 80° C. to 180° C., with a catalyst system consisting of (A) an organic carboxylic acid salt or an organic metal complex compound of nickel, (B) titanium tetrachloride and (C) a trialkyl aluminum.

This application is a continuation-in-part of our copending application Ser. No. 474,483, "Production of Butadiene-Styrene Copolymers with a Nickel Carboxylic Acid Salt or Nickel Organic Complex Compound-Titanium Tetrachloride-Trialkylaluminum Catalyst" filed July 23, 1965, and now abandoned.

This invention relates to a process for the production of butadiene-styrene or butadiene-α-alkylstyrene graft copolymer having a high cis-1,4-butadiene content, by using a catalyst system consisting of (A) an organic carboxylic acid nickel salt or an organic complex compound of nickel, (B) titanium tetrachloride and (C) a trialkylaluminum compound.

It is an object of this invention to provide a novel and useful catalyst system for the preparation of a butadiene graft copolymer having a high cis-1,4 content from butadiene and styrene or α-alkylstyrene.

Another object is to provide a useful low pressure process for obtaining a butadiene graft copolymer, wherein butadiene is substantially completely polymerized in the presence of the above three component catalyst and graft-copolymerized with styrene or α-alkylstyrene at a temperature of 80 to 180° C.

Recently, in order to improve rubbers, plastics or fibers or to provide novel copolymers, many studies for grafting various monomers to these rubbers, plastics and fibers have been made. For example, various attempts have been made in order to retain the advantages of cis-1,4-polybutadiene and improve the difficulties. Among them, if a graft copolymer copolymerized vinyl substituted aromatic hydrocarbon monomer to cis-1,4-polybutadiene is obtained, characteristic physical properties are expected.

However, it has been known that in general, when a polymer is grafted with the other monomer and the polymer in the solution or a dispersion in a solvent is added with a radical type catalyst or irradiated with radiation, light and the like; the graft efficiency of the resulting polymer is less than 50%, usually less than 30% and gelation is liable to be caused and undesirable results are brought about.

Recently, it has been reported that a useful high impact resin is obtained by grafting styrene to cis-1,4-polybutadiene produced by means of catalyst prepared from an organometallic compound and an iodine-containing compound by adding a radical catalyst (Japanese patent application publication No. 6,917/66). This catalyst for cis-1,4-polybutadiene has no polymerization activity for styrene and styrene acts only as a solvent. Accordingly, if in order to promote the polymerization of styrene, the copolymerization is effected by adding a radical type catalyst, for example, a peroxide catalyst (this catalyst has a function for inactivating the cis-1,4-polybutadiene catalyst), the resulting polymer consists of a mixture of polybutadiene-styrene graft polymer, homopolybutadiene and homopolystyrene.

The inventors have found unexpectedly that when butadiene is substantially completely polymerized by means of a nickel base three component catalyst and styrene or α-alkylstyrene is added and copolymerized thereto at an increased temperature, high cis-1,4-butadiene graft copolymers having substantially no gel can be easily synthesized in a high graft efficiency.

The process of the present invention is essentially different from the above described graft processes and has the following advantageous features:

(1) The catalyst for preparing the cis-1,4-butadiene graft copolymers of the present invention consists of three components, all or two of which are soluble in organic solvents, and the soluble or dispersed corpuscular catalyst is prepared by a simple procedure is highly active and affords readily reproducible results.

After polymerization, the catalyst of this invention can be readily separated from the polymer by washing with alcohol, but the separation may be omitted because the catalyst is usually used in a small quantity and becomes harmless after being inactivated with alcohol, alcohol-ketone or the like.

(2) Butadiene graft copolymers produced by the process of the instant invention have high cis-1,4 contents of butadiene and substantially no gel. According to the invention, graft copolymers having cis-1,4 contents of at least 85% and substantially no gel are stably obtained without being affected by the ratio of the three components, catalyst preparation methods and copolymerization conditions.

This is one of the important characteristics of the catalyst of the invention.

(3) The present process gives graft copolymers having a high graft efficiency.

The graft efficiency to be used as an indication of graft copolymer is defined as follows:

$$\{(S_T - S_H)/S_T\} \times 100$$

In the above formula, $S_T$ is the total amount of styrene or α-alkylstyrene polymerized and $S_H$ is the amount of homopolystyrene or homopoly-α-alkylstyrene copolymerized.

It is considered that the copolymers of the present invention are graft copolymers, wherein the main chain is composed of high cis-1,4-polybutadiene and the side chain is composed of polystyrene, poly-α-alkylstyrene or a linking chain consisting mainly of said polymer.

The reason is based on the fact that (1) the production of the copolymers is two stage process and (2) as shown in Example 1 for producing the copolymer having a high long chain ratio, the number of linking chain of polystyrene or poly-α-alkylstyrene copolymerized to one molecule of cis-1,4-polybutadiene is more than 1 in average.

The copolymerization reaction of the present invention comprises the first stage for polymerizing butadiene into cis-1,4-polybutadiene and the second stage for copolymerizing styrene or α-alkylstyrene. In general, styrene or α-alkylstyrene undergoes thermal polymerization at a temperature of higher than 50° C., particularly, higher than 100° C. to form the homopolymer, so that it has been considered that a temperature of higher than 100°

C. is not preferable in the copolymerization in order to improve the activity, because the graft efficiency is decreased.

However, it has been found that in the present process using the catalyst according to the invention, the copolymerization activity can be considerably increased by effecting the copolymerization in the second stage at a temperature of 80° C. to 180° C., particularly, 100° C. to 160° C. and further that unexpectedly the graft efficiency is not decreased and rather is more improved than in case of a low polymerization temperature and the formation of gel does not substantially occur. It has been well known that the physical properties of the copolymer in a high graft efficiency are superior to those of a blend of polybutadiene with homopolymer of styrene of α-alkylstyrene.

(4) Other advantage of the present invention is that it is possible to adjust a length of linking chain of styrene or α-alkylstyrene to be grafted to polybutadiene. It is an important factor that the length of linking chain of styrene or α-alkylstyrene gives various characteristics to the physical properties.

(5) It is the other advantage that the graft copolymers of the present invention have alower solution viscosity than cis-polybutadiene and on the other hand, particularly, in a long chain ratio, the graft copolymers show a high Mooney viscosity. For example, the graft copolymer having a high graft efficiency (more than 90%) obtained by copolymerizing styrene is a cis-1,4-polybutadiene polymerization solution having an intrinsic viscosity of 2.62 in toluene at 30° C. and a Mooney viscosity of 43.0 at 100° C. contains 15.5% of styrene and show an intrinsic viscosity of 2.15 and a Mooney viscosity of 91.0. These behaviors of the solution viscosity and the solid viscosity are very interesting and the resulting graft copolymers are very compatible with various oils by various means as in conventional rubbers or plastics and inexpensive oil extended graft copolymers can be easily obtained.

(6) This invention also relates to copolymers which have better heat aging properties and higher hardness than those of cis-1,4-polybutadiene with an identical modulus level.

Therefore, these copolymers are effective in improving the cornering force of tires by increasing the hardness of the tire stock without diminishing cut growth resistance with respect to groove crack resistance of tires.

According to the present invention, butadiene is reacted with a substance selected from the group consisting of styrene and α-alkylstyrene such as α-methylstyrene, α-ethylstyrene, α-propylstyrene or the like. It is preferred to use styrene as the comonomer therewith.

The A-component of the catalyst is a nickel compound selected from organic carboxylic acid nickel salts and organic complex compounds of nickel. They are as follows:

(1) Organic carboxylic acid salts of nickel having the formula

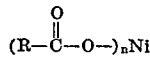

(wherein R is a hydrocarbon radical having from 1 to 20 carbon atoms and $n$ is the valence of nickel) and including nickel salts of aliphatic-, alicyclic-, and aromatic carboxylic acids, for example, nickel formate, nickel acetate, nickel 2-ethylhexoate, nickel palmitate, nickel isooctenate, nickel stearate, nickel oxalate, nickel napthenate, nickel benzoate, and the like compounds. It is preferred to use nickel 2-ethylhexoate, nickel palmitate, nickel isooctenate, nickel stearate, or nickel napthenate.

(2) Examples of organic complex compounds of nickel are the hydroxyketone complex compounds such as acetylacetone nickel; hydroxyester complex compounds such as acetacetic ethylester nickel; 8-hydroxyquinoline complex compounds such as 8-hydroxyquinoline nickel; hydroxyaldehyde complex compounds such as salicylaldehyde nickel tetracarbonyl. It is preferred to use a compound selected from the group consisting of acetacetic ethylester nickel, acetylacetone nickel and 8-hydroxyquinoline nickel.

The B-component of the catalyst of the present invention is titanium tetrachloride.

The C-component of the catalyst to be used according to the process of the present invention is a trialkylaluminum, wherein alkyl group contains from 1 to 6, preferably 2 to 4 carbon atoms, for instance, triethylaluminum, tributylaluminum or triisobuytlaluminum. It is preferable to employ triethylaluminum or triisobutylaluminum.

These A, B and C components of the catalyst have the same indispensable properties in regards for cis-1,4-butadiene graft copolymerizations.

By selecting each component from the above list of preferred embodiments and combining them, preferable three-component catalysts can be obtained such as; nickel naphthenate-titanium tetrachloride-triethylaluminum or triisobutylaluminum, nickel 2-ethylhexoate-titanium tetrachloride-triethylaluminum or triisobutylaluminum, nickel isooctenate-titanium tetrachloride-triethylaluminum or triisobutylaluminum, nickel stearate-titanium tetrachloride-triethylaluminum or triisobutylaluminum, nickel benzoate-titanium tetrachloride-triethylaluminum or triisobutylaluminum, acetylacetone nickel-titanium tetrachloride-triethylaluminum or triisobutylaluminum, acetacetic ethylester nickel-titanium tetrachloride-triethylaluminum or triisobutylaluminum, 8-hydroxyquinoline nickel-titanium tetrachloride - triethylaluminum or triisobutylaluminum. Among these catalysts above mentioned three component systems containing an organic acid nickel salt soluble in an organic solvent such as nickel 2-ethylhexoate, nickel isooctenate, nickel stearate or nickel naphthenate as the A-component are more preferable. The catalyst is usually soluble or, in certain cases, dispersed corpuscularly in organic solvents. Said catalyst system is generally prepared by mixing the three components in an inert atmosphere and in a suitable diluent.

When the three component catalysts are prepared by mixing the A, B and C components, the ratio of the mixture and the mixing temperature of these components, and other various factors influence the copolymerization. Among these conditions, the mixture ratio is an important factor. The mole ratio of the A-component to the C-component is usually within the range of about 0.5 to about 3.0, preferably within the range of about 0.8 to about 2.0. The mole ratio of the C-component to the B-component is usually within the range of about 0.3 to about 5.0, but it is preferably within the range of about 0.7 to about 2.5.

The catalyst system is prepared by admixing said three components in an anhydrous liquid hydrocarbon diluent generally at a temperature of between about —50° C. and about 80° C., preferably between about —5° C. and about 40° C. If necessary to modify the catalytic function of the system, aging or heat-treating thereof can be carried out after its preparation.

When the catalyst of the present invention is stored at room temperature, its activity remains unchanged over long periods of time.

The ratio of the amount of the catalyst to that of the monomers is not especially critical in this i nvention, but less than 10 mol percent of catalyst based on the total monomers is not especially critical in this invention, but tadiene copolymers.

It is desirable not to bring water, oxygen and the like into contact with the catalyst, but the effect of these materials on the graft copolymerization activity and the cis-1,4-orientating activity of the catalyst system is not particularly sensitive and, accordingly, it is to be understood that some of these materials can remain in the reaction mixture.

In an embodiment for the preparation of these copolymers, the polymerization of butadiene is effected, after which styrene or α-alkylstyrene is charged to the polymerization zone.

In the present invention, the contacting of the butadiene with the catalyst system is effected at a temperature within the range of −30° C. to 150° C., preferably 0° C. to 100° C., and styrene or α-alkylstyrene is added to the polymerization zone and copolymerized at a temperature within the range of 80° C. to 180° C., preferably 100° C. to 160° C., in liquid phase, under a pressure sufficient to maintain the reaction system in liquid phase and under an inert atmosphere.

If the copolymerization is effected at a temperature of higher than 200° C., the graft efficiency decreases and gel is formed, so that such a temperature is not preferable.

Butadiene polymerizes at a very satisfactory rate in the presence of the catalyst of this invention whereas styrene or α-alkylstyrene polymerizes slowly in comparison with the butadiene, but, upon increasing the polymerization temperature as hereinbefore specified, the activity of the styrene or α-alkylstyrene polymerization is considerably improved and the graft efficiency of the copolymer is very high.

In the production of the graft copolymers, butadiene is polymerized in the first stage in the presence of the catalyst system of the invention and in this case, by adjusting the amount of butadiene in the reaction system after the first stage, the length of linking chain of styrene or α-alkylstyrene in the resulting graft copolymers can be adjusted as mentioned hereinafter. The adjustment of the amount of butadiene can be carried out by varying polymerization conversion ratio of butadiene, removing unreacted butadiene partially or completely or adding butadiene.

Copolymerization is effected by using butadiene and styrene or α-alkylstyrene substantially free of catalyst poisons.

The process of this invention is carried out in the presence of a hydrocarbon diluent. Aromatic hydrocarbons, paraffins, and cycloparaffins are applicable. The preferred hydrocarbons of these types are those containing from 3 to 12 carbon atoms. Examples of diluents which can be used include propane, isobutane, n-pentane, n-hexane, n-heptane, benzine, isooctane, n-dodecane, cyclopentane, cyclohexane, methylcyclohexane, benzene, toluene, xylene, and the like. Mixtures of two or more of these hydrocarbons can be used if desired.

Purification of diluents can be carried out by generally known methods.

These copolymers also have contents of cis-1,4-configuration of at least 85%, usually 90 to 95%.

The intrinsic viscosity of the graft copolymers after the two stage copolymerization is lower than that of usual polybutadiene, so that the stirring can be effected conveniently, the heat is easily diffused, the polymerization can be effected in a high concentration and at the same time the solid viscosity becomes larger and if necessary, the copolymer having Mooney viscosity of more than 100 can be easily obtained.

Among the structure of the graft copolymer, the length of linking chain of styrene or α-alkylstyrene gives various characteristics to the physical properties, so that it is a very important factor. The length of the linking chain can be determined by the oxidation decomposition process by means of a peroxide in the presence of osmium tetraoxide catalyst. Namely, when the graft copolymer of the present invention is subjected to an oxidation decomposition, only the linking chain of butadiene is completely decomposed and the linking chain of styrene or α-alkylstyrene remains in undecomposed state and when methanol is added thereto, the remaining chain having a polymerization degree of less than about 5 is soluble in methanol and the remaining chain having a polymerization degree of more than about 5 is insoluble in methanol. The molecular weight of the methanol insoluble linking chain can be determined by a conventional process. The ratio of the methanol insoluble linking chain shows the long chain ratio. Namely, the long chain ratio can be shown by the following formula.

$$\frac{S_R - S_H}{S_T - S_H} \times 100$$

In the above formula $S_T$: the total amount of styrene or α-alkylstyrene polymerized.

$S_H$: the amount of styrene or α-alkylstyrene polymer which has not been copolymerized, that is, homopolystyrene or homopoly-α-alkylstyrene (as mentioned above, it is a characteristic in the present invention that $S_H$ is small).

$S_R$: the amount of long chain styrene or α-alkylstyrene polymer obtained as methanol insoluble portion after the oxidation of the graft copolymer.

As to the relation of this long chain ratio to the physical properties, for example, the graft copolymer having a high long chain ratio is much larger in an increasing ratio of Mooney viscosity than the graft copolymer having a medium or low chain ratio and the vulcanized product of this graft copolymer is excellent in tensile strength, heat resistance, blow-out and on the other hand, the vulcanized product of the copolymer having a low long chain ratio is excellent in abrasion resistance, cut-gross, resilience and tear strength. As seen from this fact, the graft copolymers of the invention show individual characteristics according to the difference of the long chain ratio.

The adjustment of long chain ratio of styrene or α-alkylstyrene in the graft polymer of the invention can be easily effected by controlling an amount of butadiene in the reaction system. When the amount of butadiene in the second stage is suppressed to less than 5% of the amount of butadiene fed, the long chain ratio of the graft copolymer is more than 60%, usually, more than 80%. On the other hand, as the amount of butadiene in the reaction system of the second stage is larger, the long chain ratio decreases and the long chain ratio varies according to the polymerization condition, but when the amount of butadiene in the second stage is usually more than 30% of the amount of butadiene fed, the long chain ratio is less than 20%.

The graft efficiency of styrene or α-alkylstyrene is more than 70% and usually 80–100%.

The microstructure of the butadiene units and the content of the styrene or α-alkylstyrene in the copolymers were determined according to infrared spectroscopic analysis. Intrinsic viscosities were determined in toluene at 30° C. Gel contents of these copolymers were measured by filtering their solution in benzene with 200 mesh wire gauze, and were substantially zero in the copolymers obtained from the catalyst system of the invention.

The separation of the catalyst from the copolymer can be effected in the following simple manner.

After the completion of the reaction, if necessary, a solvent containing a small percentage of phenyl-β-naphthylamine is added to dissolve the copolymer completely or to lower the viscosity of the reaction mixture, and the mixture is poured into a large quantity of non-solvent, such as methanol, isopropyl alcohol, or methanol-acetone to precipitate the copolymer. For example, the copolymer prepared with a three-component catalyst of nickel 2-ethylhexoate, titanium tetrachloride and triethylaluminum has a brown color because of the remaining catalyst, but it changes to a white copolymer gradually by washing several times with methanol.

Because the catalyst of this invention is highly active, the synthesis of cis-1,4-butadiene graft copolymers can be effected with a very small quantity thereof. When a pure polymer is not necessary, it can be used without taking pains to eliminate the catalyst as its content is very small and it is harmless.

The graft copolymers of the invention have wide properties from rubbery state to resinous state only by changing the composition of monomer units contained in the graft copolymer and can be applied to various uses. For example, when the graft copolymer having a styrene content of 5 to 30% is used for tire rubber, such graft copolymer can provide tire by the same compounding, vulcanization and molding as used in conventional natural rubber and this tire has characteristic properties in heat resistance, abrasion resistance, skid resistance and the like. As the other example, a high styrene copolymer can be easily molded by a conventional working process for plastics and has a high utility as high impact resin.

The following examples are given to illustrate a preferred method of operating according to the present invention.

EXAMPLE 1

A 300 ml. pressure bottle was dried thoroughly and purged with anhydrous nitrogen. Then, into the pressure bottle were added 62.6 ml. of toluene, 0.612 mmol of nickel naphthenate and 0.510 mmol of titanium tetrachloride. After standing for 10 minutes, 0.510 mmol of triethylaluminum was added therein, and the resulting mixture was reacted for 10 minutes to prepare a catalyst. Each of the above-mentioned operations was effected at 20° C.

The catalyst system was cooled to −78° C. and added with 0.25 mol of butadiene, and a polymerization was effected at 40° C. for 14 hours. The polymerization conversion of butadiene was 97.0%. Then, 0.25 mol of styrene was added to the resulting system and a copolymerization reaction was effected at 140° C. After 3 hours, methanol containing a small amount of phenyl-β-naphthylamine was added to the polymerization system to shortstop the reaction, whereby the resulting copolymer was precipitated. The copolymer was a strong rubbery elastic copolymer. The yield was 56.6%.

From infrared analysis, the copolymer contained 49.9% of styrene and 81.1% of cis-1,4 bond. The copolymer had an intrinsic viscosity of 0.90 and no gel.

It was apparent from the following three reasons that the reaction product was a graft copolymer.

(1) A two-stage copolymerization reaction is adopted.

(2) When styrene is added and copolymerized with polybutadiene in such a state that there is substantially no butadiene monomer in the reaction system, and the number of polystyrene chains copolymerized with one molecule of polybutadiene is larger than 1 in average.

(3) Butadiene unit and styrene unit are bonded chemically.

The reason (3) was verified by the two-phase-fractional extraction method using n-hexane and N,N′-dimethylformamide (hereinafter abridged as DMF), by which the homopolymers can be separated quantitatively from the mixture.

Namely, 1 g. of the reaction product is dissolved in 200 ml. of n-hexane and the resulting solution is put into a separating funnel. Then, 100 ml. of DMF are added thereto, shaken and left to stand. The resulting solution is separated into two layers, and homopolystyrene is dissolved selectively in the lower DMF layer. 100 ml. of fresh DMF are added to the upper hexane layer and further extraction and separation are effected. The first and the second DMF layers are combined and DMF is removed by drying under vacuum and the resulting homopolystyrene is weighed.

Thus, the graft efficiency defined in the specification can be determined.

On the other hand, it has been confirmed that the blend of polybutadiene with polystyrene can be separated completely into each homopolymer by the above mentioned process (i.e. the graft efficiency is 0).

The reason (2) was verified by cutting the double bond of polybutadiene in the main chain by oxidation decomposition after confirming the high graft efficiency, recovering the side chain of styrene polymer and determining the molecular weight.

The oxidation decomposition was carried out according to the method disclosed by I. M. Kolthoff et al. (J. Polymer Sci., 1 429 (1946)), in which osmium tetraoxide and tert-butyl hydroxy peroxide are used, and it was effected after it was confirmed that polybutadiene was decomposed completely and polystyrene was not decomposed. After the decomposition, the long chain ratio as defined in the specification was calculated.

The reaction product in Example 1 had a graft efficiency of 91.2% and a long chain ratio of 93.7%. Furthermore, it was found that seven polystyrene side chains were bonded to one polybutadiene main chain in average from the molecular weight of the polybutadiene in the main chain, and the polystyrene in the side chain and the styrene content of the reaction product.

EXAMPLE 2

The reaction was carried out in the same manner as described in Example 1, except that a catalyst prepared from 0.739 mmol of acetylacetone nickel, 0.528 mmol of titanium tetrachloride and 0.528 mmol of triethylaluminum was used. The yield of the graft copolymer was 25.1%. The styrene content, cis-1,4 content and graft efficiency of the graft copolymer were 59.8%, 89.3% and 90.8% respectively.

What is claimed is:

1. A process for manufacturing cis-1,4-butadiene graft copolymers having a cis-1,4 content of at least 85% and substantially no gel, which comprises substantially completely polymerizing butadiene with a catalyst at a temperature within the range of −30° C. to 150° C., and graft copolymerizing onto the thus formed polybutadiene with a graft efficiency of more than 70% a comonomer selected from the group consisting of styrene and α-alkylstyrene at a temperature within the range of 80° C. to 180° C., wherein said process is carried out in the presence of a hydrocarbon diluent containing from 3 to 12 carbon atoms, under sufficient pressure to maintain the reaction system in the liquid phase, and under an inert atmosphere, said catalyst having three components consisting of (A) a compound selected from the group consisting of organic carboxylic acid salt of nickel of the formula

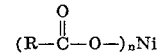

wherein R is a hydrocarbon radical having from 1 to 20 carbon atoms and $n$ is the valence of nickel, hydroxyester nickel complex, hydroxyketone nickel complex, 8-hydroxyquinoline nickel complex, hydroxyaldehyde nickel complex and nickel tetracarbonyl, (B) a titanium tetrachloride and (C) a trialkylaluminum, wherein alkyl group contains from 1 to 6 carbon atoms, the total amount of said catalyst being less than 10.0 mole percent of total monomers, the mole ratio of said (A) component to said (C) component being within the range of 0.5 to 3.0 and the mole ratio of said (C) component to said (B) component being within the range of 0.3 to 5.0.

2. A process according to claim 1, wherein said component (A) is nickel naphthenate.

3. A process according to claim 1, wherein said component (A) is acetylacetone nickel.

4. A process according to claim 1, wherein said trialkylaluminum is triethylaluminum.

5. A process according to claim 1, wherein said cis-1,4-butadiene graft copolymer is a cis-1,4-butadienestyrene graft copolymer.

6. A process for manufacturing cis-1,4-butadiene graft copolymers having a cis-1,4 content of 95% to 98% and substantially no gel, which comprises substantially completely polymerizing butadiene with a catalyst at a temperature within the range of 0° C. to 100° C., and graft copolymerizing styrene onto the thus formed polybutadiene with a graft efficiency of styrene of 80 to 100%, at a temperature within the range of 100° C. to 160° C., wherein said process is carried out in the presence of a hydrocarbon diluent containing from 3 to 12 carbon atoms, under sufficient pressure to maintain the reaction system in the liquid phase, and under an inert atmosphere, said catalyst having three components consisting of (A) an organic carboxylic acid salt of nickel of the formula

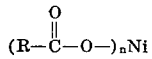

wherein R is a hydrocarbon radical having from 1 to 20 carbon atoms and $n$ is the valence of nickel, (B) titanium tetrachloride and (C) a trialkyl aluminum, wherein alkyl group contains from 2 to 4 carbon atoms, the total amount of said catalyst being less than 10.0 mole percent of total monomers, the mole ratio of said (A) component to said (C) component being within the range of 0.8 to 2.0 and the mole ratio of said (C) component to said (B) component being within the range of 0.7 to 2.5.

References Cited

UNITED STATES PATENTS

| | | | |
|---|---|---|---|
| 3,068,180 | 12/1962 | Van Amorongen et al. | 252—429 |
| 3,070,587 | 12/1962 | Zelinski | 260—94.3 |
| 3,165,503 | 1/1965 | Kahn et al. | 260—94.3 |
| 3,215,682 | 11/1965 | Farrar et al. | 260—94.3 |

FOREIGN PATENTS

| | | | |
|---|---|---|---|
| 820,089 | 9/1959 | Great Britain | 260—880 |
| 905,099 | 9/1962 | Great Britain | 260—94.3 |
| 906,334 | 9/1962 | Great Britain | 260—94.3 |

ALLAN LIEBERMAN, Primary Examiner